United States Patent
Yao et al.

(10) Patent No.: US 11,336,869 B2
(45) Date of Patent: May 17, 2022

(54) MOTION DETECTION METHODS AND MOTION SENSORS CAPABLE OF MORE ACCURATELY DETECTING TRUE MOTION EVENT

(71) Applicant: PixArt Imaging Inc., Hsin-Chu (TW)

(72) Inventors: Wen-Han Yao, Hsinchu County (TW); Chih-Huan Wu, Hsinchu County (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/010,793

(22) Filed: Sep. 2, 2020

(65) Prior Publication Data
US 2020/0404223 A1 Dec. 24, 2020

Related U.S. Application Data

(62) Division of application No. 16/261,569, filed on Jan. 30, 2019, now Pat. No. 10,805,579.

(51) Int. Cl.
| | |
|---|---|
| *H04N 7/18* | (2006.01) |
| *G06T 7/246* | (2017.01) |
| *G06T 7/00* | (2017.01) |
| *G06T 7/80* | (2017.01) |
| *H04N 5/235* | (2006.01) |

(52) U.S. Cl.
CPC ......... *H04N 7/188* (2013.01); *G06T 7/0002* (2013.01); *G06T 7/248* (2017.01); *G06T 7/80* (2017.01); *H04N 5/2351* (2013.01); *H04N 5/2353* (2013.01); *G06T 2207/30168* (2013.01); *G06T 2207/30232* (2013.01)

(58) Field of Classification Search
CPC .... H04N 7/188; H04N 5/2351; H04N 5/2353; H04N 5/232411; H04N 5/232; H04N 7/181; G06T 7/248; G06T 7/0002; G06T 7/80; G06T 2207/30232; G06T 2207/30168; G06T 7/254; G08B 13/19
See application file for complete search history.

(56) References Cited

U.S. PATENT DOCUMENTS

| | | | | |
|---|---|---|---|---|
| 6,754,367 | B1 * | 6/2004 | Ito | G06K 9/00771 348/154 |
| 9,596,398 | B2 * | 3/2017 | Khawand | H04N 5/23229 |
| 2005/0259740 | A1 * | 11/2005 | Kobayashi | H04N 19/172 375/240.16 |
| 2006/0198611 | A1 * | 9/2006 | Park | H04N 21/4334 386/226 |
| 2012/0268274 | A1 * | 10/2012 | Wieser | G08B 13/19606 340/545.2 |

(Continued)

FOREIGN PATENT DOCUMENTS

| | | |
|---|---|---|
| CN | 102201121 A | 9/2011 |
| CN | 108509931 A | 9/2018 |

*Primary Examiner* — Gevell V Selby
(74) *Attorney, Agent, or Firm* — Winston Hsu

(57) ABSTRACT

A motion detection method utilized for a motion sensor includes: capturing a monitoring image; entering a recording mode when one intensity change value between the monitoring image and a pre-stored background image is higher than a first threshold and a trigger signal is received from an auxiliary sensor; and entering the recording mode when the intensity change value is higher than a second threshold before the trigger signal is received; wherein the second threshold is higher than the first threshold.

6 Claims, 8 Drawing Sheets

(56) References Cited

U.S. PATENT DOCUMENTS

2014/0072211 A1 3/2014 Kovesi
2017/0309038 A1 10/2017 Dorster
2018/0322751 A1 11/2018 Sacre

* cited by examiner

MOTION DETECTION METHODS AND MOTION SENSORS CAPABLE OF MORE ACCURATELY DETECTING TRUE MOTION EVENT

CROSS REFERENCE TO RELATED APPLICATIONS

This division application claims the benefit of U.S. application Ser. No. 16/261,569, which was filed on 2019 Jan. 30, which is entirely incorporated herein by reference.

BACKGROUND OF THE INVENTION

1. Field of the Invention

The invention relates to a motion detection mechanism, and more particular to motion detection methods and motion sensors capable of more accurately determining/detecting a true motion event.

2. Description of the Prior Art

Generally speaking, a conventional image sensor is arranged to perform an image motion detection based on merely the calculation of pixel differences between different images. However, it is easy for the conventional image sensor to erroneously decide or detect pixel differences of an image caused due to other factors as a motion. For example, under some environment conditions, there is a great probability that the conventional image sensor erroneously generates a motion result. The performance of conventional motion detection is limited.

In addition, a conventional infrared sensor may be employed to detect motions of people/animals. However, under some environment conditions such as light/heat/temperature change, it is easy for the conventional infrared sensor to send or generate a false alarm motion report. The performance of conventional infrared sensor is limited. The frequently generated false alarm report may usually active or trigger a monitoring system and thus consumes more power.

It is important to provide a novel motion detection mechanism/method which can more accurately determine or detect true motions of people/animals as well as achieve power saving.

SUMMARY OF THE INVENTION

Therefore one of the objectives of the invention is motion sensors and motion detection methods utilized in the motion sensors, to solve the above-mentioned problems.

According to embodiments of the invention, a motion detection method utilized for a motion sensor is disclosed. The method comprises: capturing a monitoring image; entering a recording mode when one intensity change value between the monitoring image and a pre-stored background image is higher than a first threshold and a trigger signal is received from an auxiliary sensor; and entering the recording mode when the intensity change value is higher than a second threshold before the trigger signal is received; wherein the second threshold is higher than the first threshold.

According to the embodiments, a motion detection method utilized for a motion sensor is disclosed. The method comprises: capturing a monitoring image; and entering a recording mode if the monitoring image's quality is under a disqualify threshold and a trigger signal from an auxiliary sensor is received.

According to the embodiments, a motion detection method utilized for a motion sensor is disclosed. The method comprises: capturing a monitoring image; comparing the monitoring image and a pre-stored background image; and entering a recording mode if at least one first specific number of pixels become brighter from the pre-stored background image to the monitoring image, and at least one second specific number of pixels become darker from the pre-stored background image to the monitoring image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
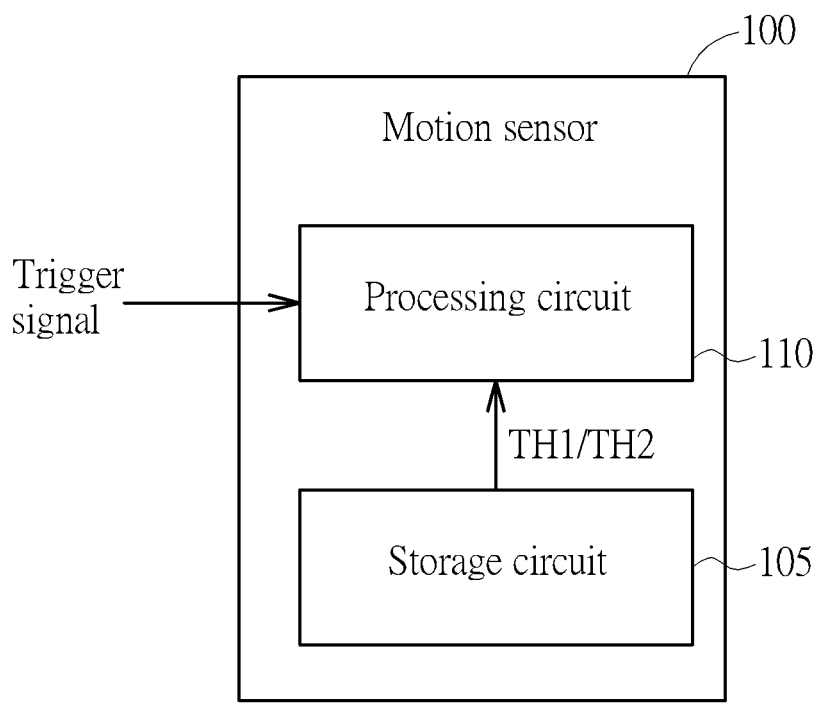
FIG. 1 is a block diagram of a motion sensor according to a first embodiment of the invention.
Figure 2:
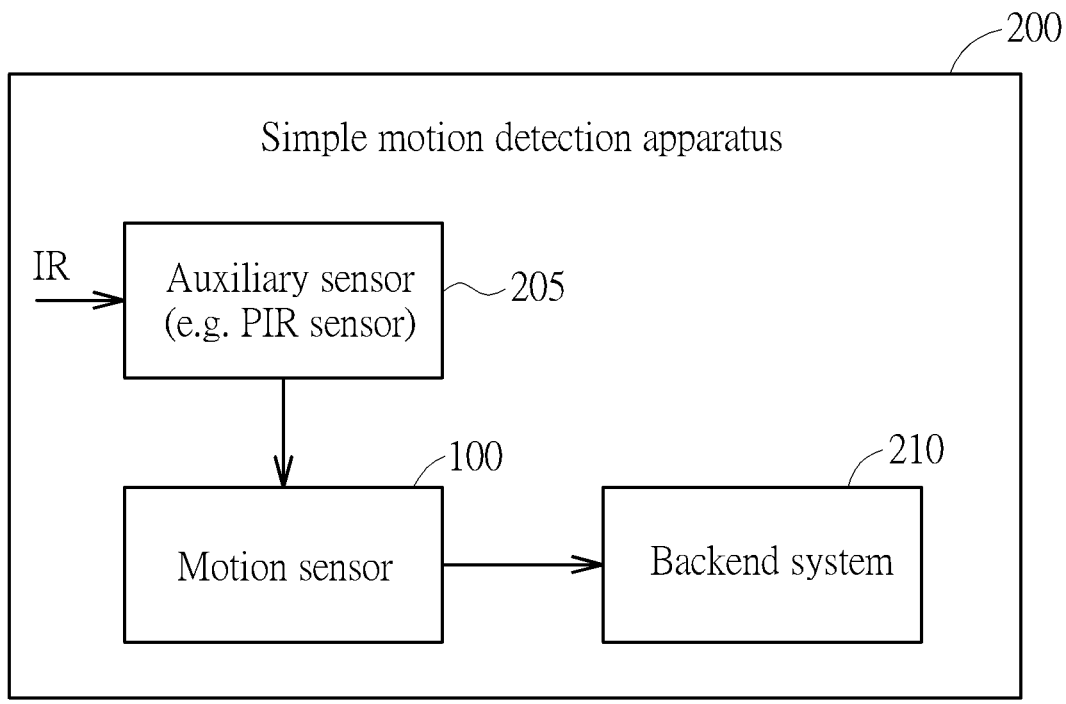
FIG. 2 is a block diagram of a simple motion detection apparatus comprising the motion sensor of FIG. 1 according to a second embodiment of the invention.

Refer to FIG. 1 in conjunction with FIG. 2. FIG. 1 is a block diagram of a motion sensor 100 according to embodiments of the invention. FIG. 2 is a block diagram of a simple motion detection apparatus 200 comprising the motion sensor 100 of FIG. 1 according to embodiments of the invention. The motion sensor 100 comprises a storage circuit 105 and a processing circuit 110. The motion sensor 100 is for example applied into a monitoring system and is arranged to enter a sleep mode (or a power saving mode) at ordinary times and can be activated (woken up) periodically to capture and sense a monitoring image to perform a regularly monitoring operation. For example, when the motion sensor 100 is activated, the motion sensor 100 currently captures an image or a predetermined number of images to generate a monitoring image or a plurality of monitoring images.

In the monitoring system, the motion sensor 100 is used to determine whether a true motion event occurs in such monitoring image based on its intensity thresholds TH1/TH2 and information of whether a trigger signal is received from an auxiliary sensor. If the motion sensor 100 determines that the true motion event occurs, then the motion sensor 100 enters the recording mode to record the true motion event and also notifies a backend system of the true motion event. For example, the motion sensor 100 may take and record a video for the true motion event for ten seconds (but not limited). The backend system, for example, is notified to alarm a user to exam the video.

If the motion sensor 100 determines that no true motion events occur in the monitoring image, then the motion sensor 100 is arranged to classify this monitoring image as a background image, and then to store the background image in the motion sensor 100 as a pre-stored background image which is to be used for a next monitoring image. For example, the motion sensor 100 compares a next monitoring image with the pre-stored background image to decide whether a true motion event occurs in the next monitoring image to determine whether to exit the sleep mode and then enter the recording mode.

Additionally, the simple motion detection apparatus 200 comprise the motion sensor 100, an auxiliary sensor 205, and a backend system 210. For example, the simple motion detection apparatus 200 may be used in a monitoring system, the auxiliary sensor 205 is arranged to real-time monitor whether a possible motion event occurs, the motion sensor 100 is used to identity if the possible motion event is a person's motion, and the backend system 210 is used to receive a notice from the motion sensor 100 to provide security protection.

The auxiliary sensor 205 such as a PIR sensor 205 (but not limited) is configured to measure infrared (IR) light radiating from objects in its field of view and to sense movement of people, animals, or other objects to output or report a corresponding motion alarm/result/information/signal, i.e. a trigger signal, to the motion sensor 100. In another embodiment, the auxiliary sensor 205 can be implemented by a low resolution sensor, such as a sensor includes only a 4*4 or 2*2 sensor array.

The backend system 210 may be implemented by the motion sensor 100 or an external device, so as to receive the notice from the motion sensor 100 and provide security protection by alarming a user to exam a video recorded by the motion sensor 100.

The storage circuit 105 is configured to store a set of intensity threshold comprising a first intensity threshold TH1 such as a lower threshold and a second intensity threshold TH2 such as a higher threshold. The processing circuit 110 is coupled to the storage circuit 105 and includes a sensor array to capture a monitoring image to compare an intensity change between the monitoring image and a pre-stored background image. The processing circuit 110 is arranged to calculate at least one intensity change value between the monitoring image and the pre-stored background image. For example, the intensity change value includes a brightness intensity change value and a darkness intensity change value.

To calculate the brightness intensity change value, the processing circuit 110 for example is arranged to calculate a number of pixel units between the monitoring image and the pre-stored background image each having a brighter pixel change greater than a brightness variation threshold as the brightness intensity change value. Also, to calculate the darkness intensity change value, the processing circuit 110 for example calculates a number of pixel units between the monitoring image and the pre-stored background image each having a darker pixel change greater than a darkness variation threshold as the darkness intensity change value.

The processing circuit 110 determines whether a true motion event occurs to decide whether to enter the recording mode by referring to information of whether a trigger signal from the PIR sensor 205 is received and also by comparing the intensity change value with at least one of the intensity thresholds TH1 and TH2.

In addition, the value of the first intensity threshold TH1 and value of the second intensity threshold TH2 for the brightness intensity change value (TH1$a$, TH2$a$) may be configured to be different from those of the first intensity threshold TH1 and second intensity threshold TH2 for the darkness intensity change value (TH1$b$, TH2$b$).

The intensity change value may be determined by at least one of the brightness intensity change value and darkness intensity change value, or be determined by an average or a summation of both the brightness intensity change value and darkness intensity change value. For example, the intensity change value is determined greater than the first threshold TH1 if at least one of the brightness intensity change value and darkness intensity change value is greater than the first thresholds TH1$a$/TH1$b$ or the intensity change value is determined greater than the first threshold TH1 if both the brightness intensity change value and darkness intensity change value are greater than the thresholds TH1$a$/TH1$b$. In another example, the intensity change value is determined greater than the first threshold TH1 if an average or a summation of both the brightness intensity change value and darkness intensity change value is greater than the threshold TH1.

When one of the brightness intensity change value and darkness intensity change value is lower than a quality threshold, the intensity change value will be seemed as not greater than the first intensity threshold TH1 or the second intensity threshold TH2.

Further, if the intensity change value is higher than the first intensity threshold TH1 and a trigger signal is received from the PIR sensor 205 within a predetermined time period, the motion sensor 100 enters the recording mode.

If the intensity change value becomes higher than the second intensity threshold TH2, the motion sensor 100 also enters the recording mode. That is, if the intensity change value becomes higher than the higher intensity threshold TH2, the processing circuit 110 decides to immediately enter the recording mode no matter if the trigger signal from the PIR sensor 205 is received or not.

If the intensity change value is lower than the first intensity threshold TH1 but the trigger signal is received, then the processing circuit 110 determines to go back to the sleep mode. In this situation, the processing circuit 110 decides to enter the sleep mode since an event that the trigger signal from the PIR sensor 205 at this time is not reliable.

Figure 3:
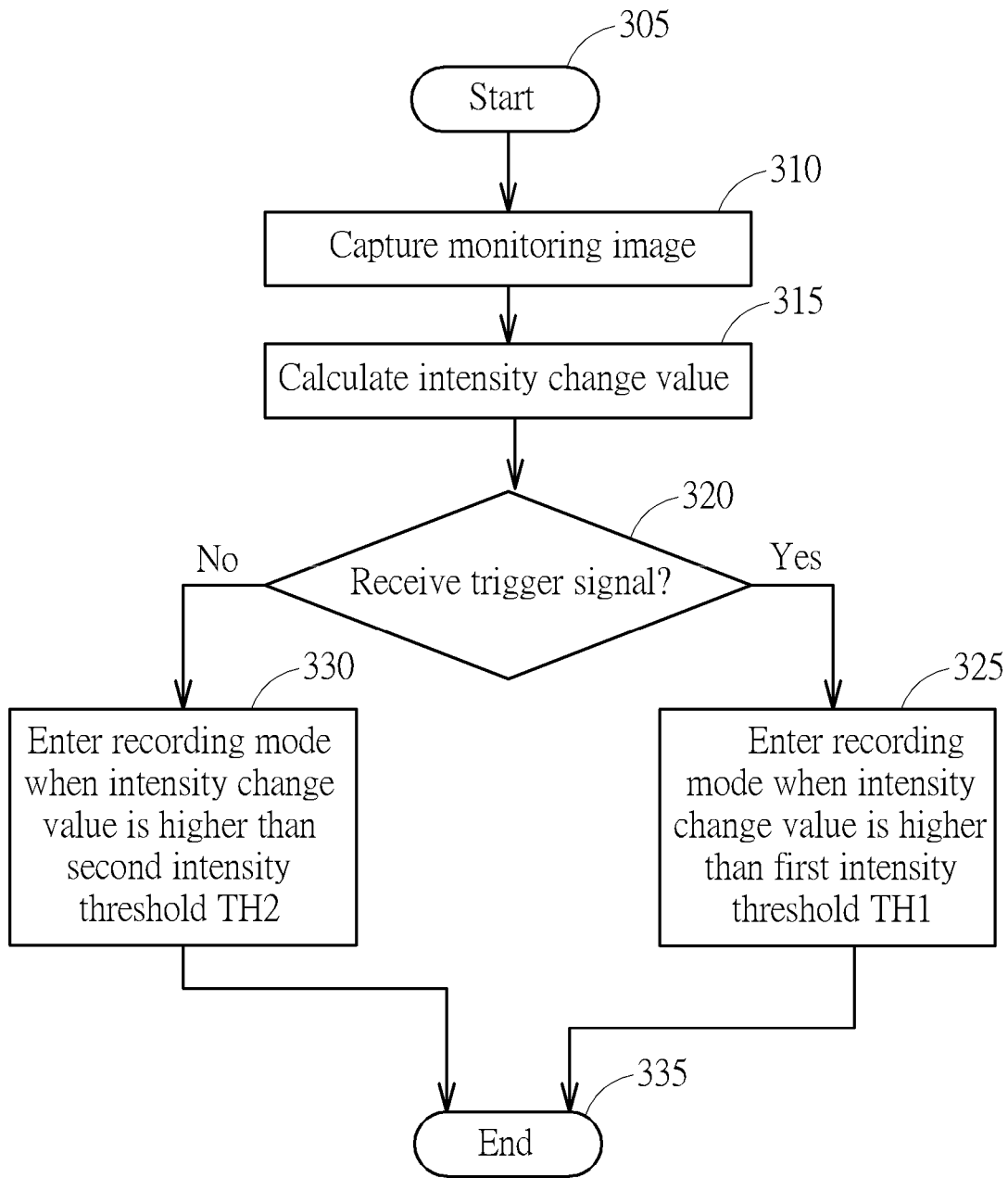
FIG. 3 is a diagram showing a flowchart of a motion detection method utilized in the motion sensor and arranged to determine whether to enter the recording mode according to an embodiment of the invention.

FIG. 3 is a diagram showing a flowchart of a motion detection method utilized in the motion sensor 100 and arranged to determine whether to enter the recording mode according to an embodiment of the invention. Provided that substantially the same result is achieved, the steps of the flowchart shown in FIG. 3 need not be in the exact order shown and need not be contiguous, that is, other steps can be intermediate. Steps are detailed in the following:

Step 305: Start;

Step 310: The processing circuit 110 captures a monitoring image;

Step 315: The processing circuit 110 calculates an intensity change value between the monitoring image and a pre-stored background image;

Step 320: The processing circuit 110 determines whether a trigger signal from the PIR sensor 205 is received; if yes, the flow proceeds to Step 325, otherwise, the flow proceeds to Step 330;

Step 325: The processing circuit 110 determines to enter the recording mode when the intensity change value is higher than the first intensity threshold TH1;

Step 330: The processing circuit 110 determines to enter the recording mode when the intensity change value is higher than the second intensity threshold TH2; and Step 335: End.

The processing circuit 110 uses the lower intensity threshold TH1 when receiving the trigger signal within a predetermined time period since the reception of trigger signal indicates a higher confidence level/event than that of no reception of a motion report result/signal; using the lower intensity threshold TH1 means that there is a greater possibility that both the brightness and darkness intensity change values are higher than the intensity threshold TH1. That is, in this situation, there is a greater possibility that the motion sensor 100 determines to enter the recording mode. Using the higher intensity threshold TH2 means that there is a smaller possibility that both the brightness and darkness intensity change values are higher than the intensity threshold TH2. That is, in this situation, there is a smaller possibility that the motion sensor 100 determines to enter the recording mode.

In addition, when entering the recording mode, the motion sensor 100 is arranged to send a notification signal to the backend system 210 to wake up the backend system 210.

Further, the processing circuit 110 may adjust or compensate an exposure level (or an auto exposure amount) of the motion sensor 100 when the intensity change value is lower than the first threshold TH1.

Additionally, in other embodiments, the motion sensor 100 will enter the recording mode according to only the trigger signal received from the PIR sensor 205 but not considering the result from the captured monitoring images from the sensory array if the monitoring image's quality is under a disqualify threshold.

Figure 4:
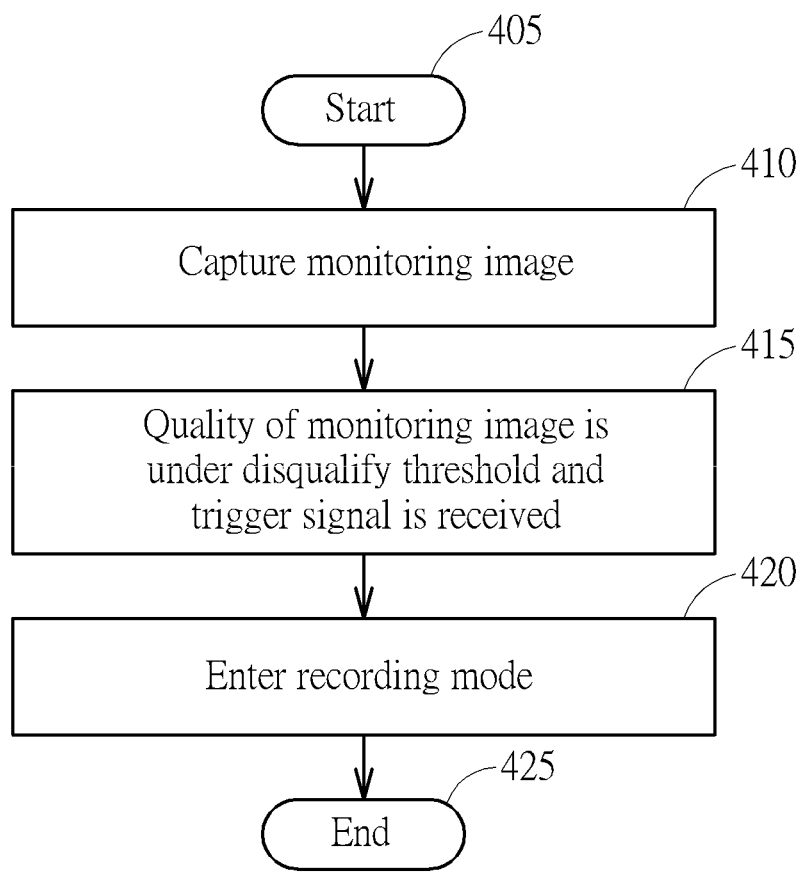
FIG. 4 is a diagram of a flowchart of a method applied to the motion sensor to determine whether/when to enter the recording mode according to another embodiment of the invention.

FIG. 4 is a diagram of a flowchart of a method applied to the motion sensor 100 to determine whether/when to enter the recording mode according to another embodiment of the invention. Provided that substantially the same result is achieved, the steps of the flowchart shown in FIG. 4 need not be in the exact order shown and need not be contiguous, that is, other steps can be intermediate. Steps are detailed in the following:

Step 405: Start;

Step 410: The processing circuit 110 captures a monitoring image;

Step 415: The processing circuit 110 determines that the quality of the monitoring image is under the disqualify threshold and the trigger signal is received;

Step 420: The processing circuit 110 decides to enter the recording mode; and

Step 425: End.

Further, in other embodiments, to save more power, the processing circuit 110 is arranged to control and operate the motion sensor 100 at a higher image rate (frame rate) when receiving a trigger signal from PIR sensor 205 while the processing circuit 110 is arranged to control and operate the motion sensor 100 at a lower image rate when no trigger signals of the PIR sensor 205 are received. When receiving such trigger signal, the processing circuit 110 controls the image rate at the higher image rate to capture a high quality monitoring image so as to more accurately determine or decide whether to enter the recording mode. When no trigger signals of PIR sensor 205 are received, the processing circuit 110 is arranged to control the image rate at the lower image rate to roughly determine or decide whether to enter the recording mode as well as achieve more power saving.

Further, in other embodiments, the processing circuit 110 is arranged to determine whether to enter the recording mode by deciding if a motion occurs in a specific image area at a spatial position of a monitoring image to avoid or reduce the interference caused by environment condition changes such as light/illumination change.

In that embodiment, the intensity change value is determined based on the pixel values of a group of pixel units defined by the specific image area in a current monitoring image and the pixel values of a group of pixel units defined by the specific image area in a pre-stored background image.

The monitoring image and the background image may be divided or classified into a plurality of specific image areas, and the processing circuit 110 performs the following calculation sequentially for each specific image area to determine whether motion occurs in the each specific image area. A size of each specific image area may be defined by M×N pixel units wherein M and N are positive integers.

Figure 5:
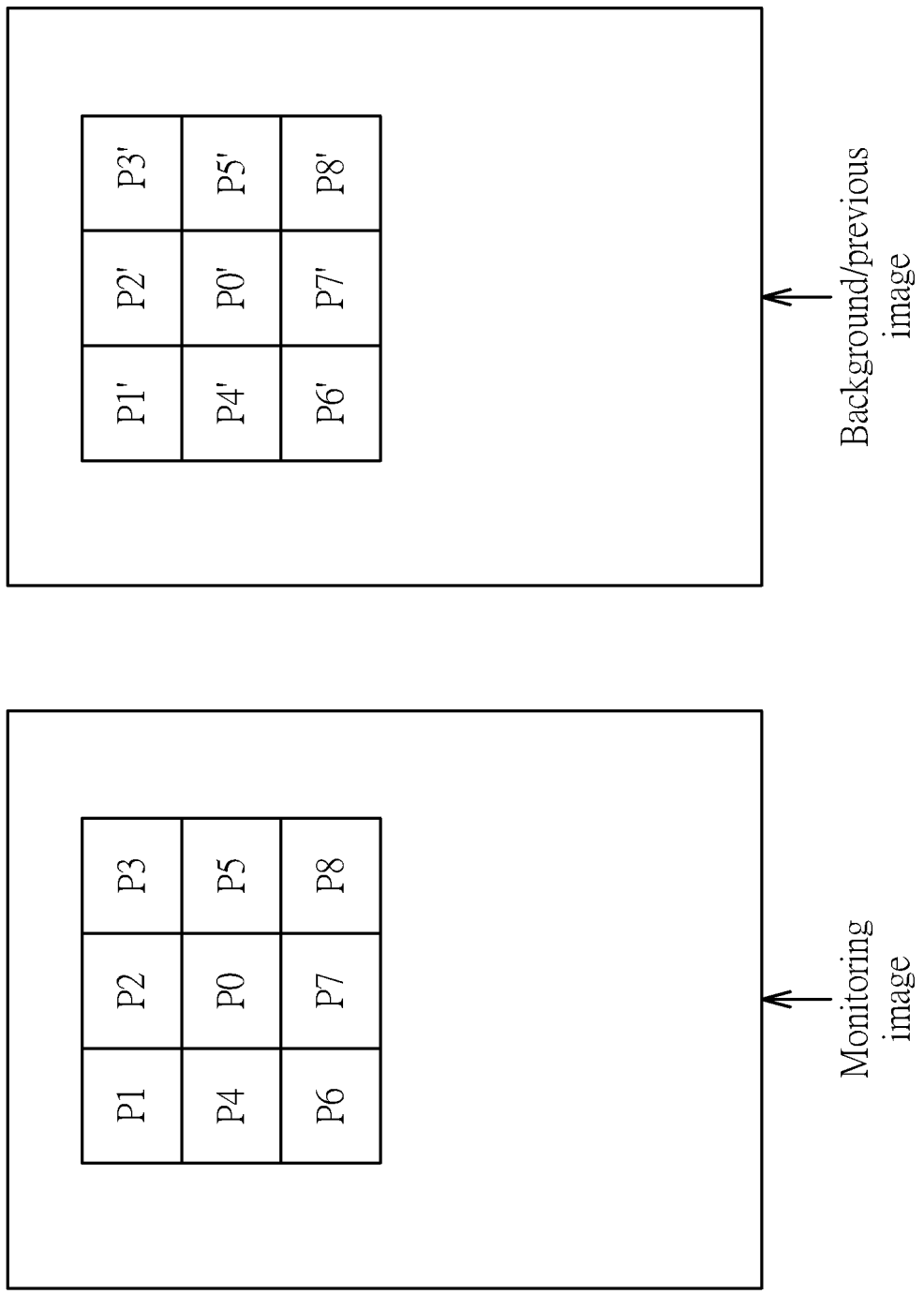
FIG. 5 is a diagram showing an example of pixel values of pixel units defined by the specific image area respectively in the monitoring image and in the background image according to one embodiment of the invention.

FIG. 5 is a diagram showing an example of pixel units within one specific image area respectively in the current monitoring image and in the background image according to one embodiment of the invention.

As shown on FIG. 5, the processing circuit 110 is arranged to classify the pixel units P0, P1, . . . , and P8 as a first group of pixel units and classify the pixel units P0', P1', . . . , and P8' as a second group of pixel units.

The processing circuit 110 calculates correlation values/parameters for the pixel values of neighboring pixel units P1~P8 and P1'~P8' compared to the pixel value of a specific pixel unit (such as the center pixel unit P0 and P0') respectively for the first group of pixel units and the second group of pixel units. In one example, the correlation values/parameters may be determined by subtracting one of pixel values of two pixel units from the other or calculating a ratio between two pixel units. For this kind of example, the intensity change value includes a brightness intensity change value that is calculated as a number of differences or ratios in the monitoring image which is greater than the corresponding differences or ratios in the background image, and a darkness intensity change value that is calculated as a number of differences or ratios in the monitoring image which is smaller than the corresponding differences or ratios in the background image.

In another example, each of the correlation values/parameters may be determined by comparing values of two pixel units wherein in the two pixel units one pixel value can be labeled as a letter symbol L which means a larger pixel value and the other pixel value can be labeled as a letter symbol S which means a smaller pixel value. For this kind of example, the intensity change value includes a brightness intensity change value that is calculated as a number of correlation values/parameters previously corresponding to the letter symbol S in the background image and becoming the letter symbol L in the monitoring image, and a darkness intensity change value that is calculated as a number of correlation values/parameters previously corresponding to the letter symbol L in the background image and becoming the letter symbol S in the monitoring image.

It should be noted that the processing circuit 110 can generate background image(s) by referring to previous monitor image(s). For instance, the processing circuit 110 may refer to last ten previous monitor images to generate one background image. However, this is not intended to be a limitation. The processing circuit can refer to different numbers of previous monitor images to generate a background image.

After the above-mentioned calculation of correlation values, the processing circuit 110 can obtain a first set of eight correlation values corresponding to the current image and a second set of eight correlation values corresponding to the background image. The processing circuit 110 considers the first set of correlation values as a first pattern and the second set of correlation values as a second pattern, and is arranged to check if all/most elements included within the first pattern are highly correlated to all/most elements included within the second pattern by calculating a relation between the first pattern and the second pattern.

If/when the relation indicates that those elements are correlated, the processing circuit 110 is arranged to determine that the first pattern and the second pattern have the same/similar image characteristics and then determine that the specific image area is affected by light/illumination change such as turning on/off a light source. In this situation, the processing circuit 110 may further decide that such specific image area is with no true motions/movements (but not limited).

Further, in some embodiments, if the processing circuit 110 determines that all specific image areas defined in the monitoring image are with motions based on the above-mentioned pattern characteristics comparison, the processing circuit 110 can decide that the monitoring image/image is illuminated by a global light source.

In addition, it should be noted that one pixel unit may comprise a single one pixel or may comprise multiple pixels or multiple sub-pixels.

In the above-mentioned embodiment, each correlation value mentioned above may indicate a sign (positive sign "+" or negative sign "−") or positive/negative values for representing different signs. For example, the processing circuit 110 may be arranged to use the positive one, i.e. 1, to indicate that a pixel unit has a symbol change from the letter symbol S in the background image into the letter symbol L in the monitoring image, and may use the negative one, i.e. −1, to indicate that a pixel unit has a symbol change from the letter symbol L in the background image to the letter symbol S in the monitoring image. That is, a correlation value which is equal to the positive one means that the pixel value of a corresponding pixel unit becomes brighter while a correlation value which is equal to the negative one means that the pixel value of a corresponding pixel unit becomes darker. For example, the first set of correlation values may be a pattern of {1, −1, 1, −1, 1, −1, 1, −1}, and the processing circuit 110 can identify or determine the first set of correlation values and the second set of correlation values have a highly correlated relation if the second set of correlation values is also a pattern of {1, −1, 1, −1, 1, −1, 1, −1}. The pattern characteristics are the same for the two set of correlation values corresponding to the current image and background image. It should be noted that the processing circuit 110 may determine that the pattern characteristics are similar if most of the first set of correlation values and most of the second set of correlation values sequentially have the same sign. The processing circuit 110 can determine a tolerance level for the pattern characteristics comparison.

Additionally, in other embodiments, the correlation values may be represented by ratio values. For example, the first set of correlation values may be represented by a sequence of ratios {2, 1.5, 2, 1, 1, 2, 1.5, 2}, and the processing circuit 110 can identify or determine the first set of correlation values and the second set of correlation values have a highly correlated relation if the second set of correlation values is also equal to the above ratios or similar rations. It should be noted that the processing circuit 110 may determine that the pattern characteristics are similar if most ratios of the first set of correlation values and most ratios of the second set of correlation values are identical or respectively have a highly correlated relation.

Further, in some examples, if the processing circuit 110 detects that multiple specific image areas with the same or similar pattern characteristics totally form a ring-shape area, then the processing circuit 110 can decide that such ring-shape area is affected by a light source being turned on/off.

Figure 6:
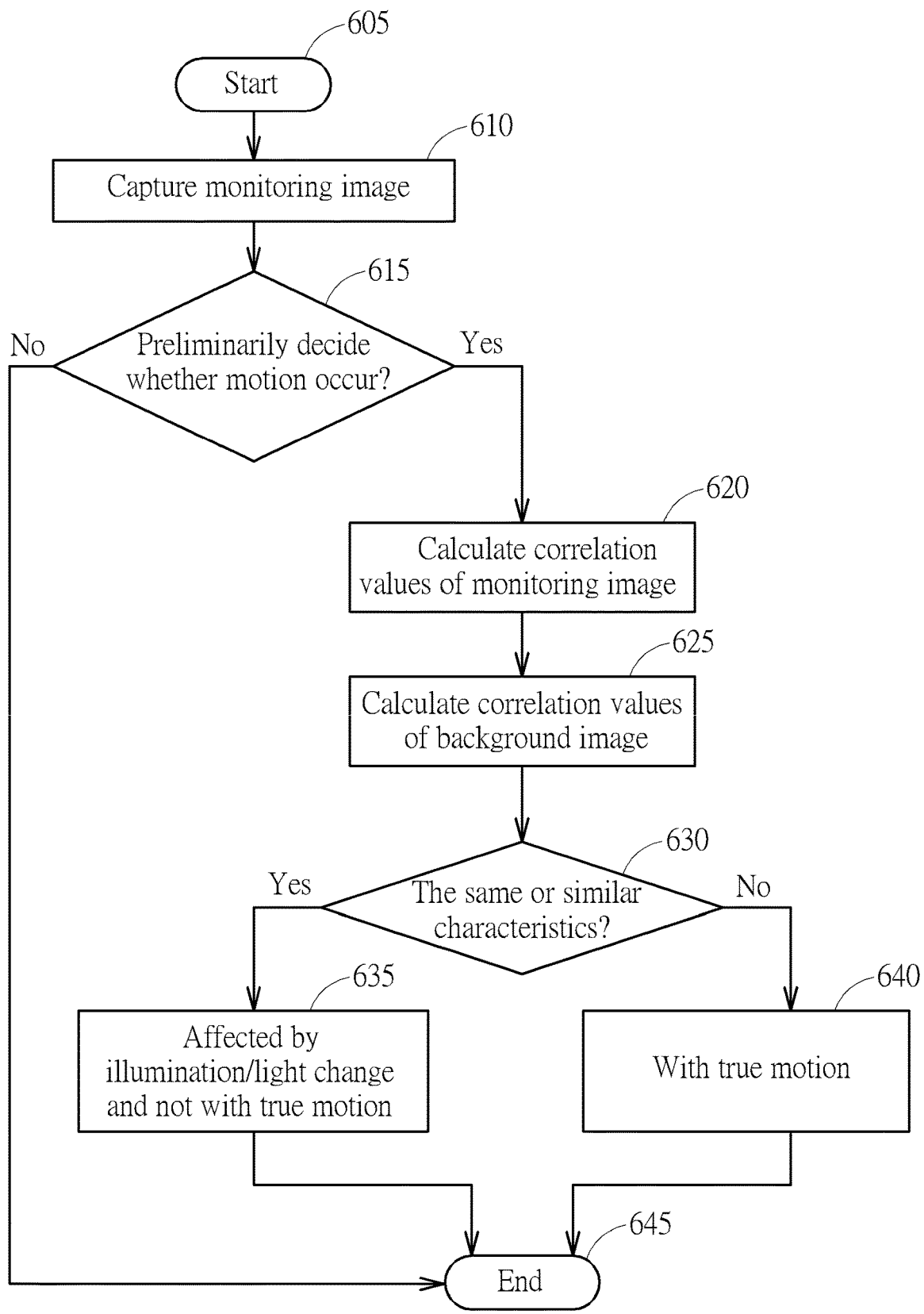
FIG. 6 is a diagram showing a flowchart of a process for more accurately detecting whether motion occurs based on the correlation values between different images according to the above-mentioned embodiments of the invention.

FIG. 6 is a diagram showing a flowchart of a process for more accurately detecting whether motion occurs based on the correlation values between different images according to the above-mentioned embodiments of the invention. Steps are detailed in the following:

Step 605: Start;

Step 610: Capture a monitoring image;

Step 615: Perform an image motion detection based on the captured monitoring image and the background image to preliminarily decide whether motion occurs; if the preliminary result indicates a motion, then the flow proceeds to Step 620, otherwise, the flow proceeds to Step 645;

Step 620: Calculate the correlation values of the monitoring image as the first pattern;

Step 625: Calculate the correlation values of the background/previous image as the second pattern;

Step 630: Compare the first pattern with the second pattern to determine whether the patterns have the same or similar characteristics; if the patterns have the same or similar characteristics, then the flow proceeds to Step 635, otherwise, the flow proceeds to Step 640;

Step 635: The processing circuit 110 determines that an image area of the current image or the current image is affected by illumination/light change and may be not with true motion;

Step 640: The processing circuit 110 determines that an image area of the current image or the current image is with true motion; and Step 645: End.

Further, in other embodiments, the processing circuit 110 may determine that a specific pixel unit such as a center pixel unit is a warning grid if determining that the all of most of the corresponding correlation values have the identical/similar characteristics (i.e. have the highly correlated relation). If the specific pixel unit is a warning grid, then the processing circuit 110 may be arranged to calculate a brightness difference of the brightness value of the center pixel unit minus the brightness value of a pixel unit at the same spatial position of the background image. If the brightness value of the center pixel unit is larger than that of the pixel unit at the same spatial position of the background image, the processing circuit 110 can determine that the center pixel unit of this current image becomes brighter. Instead, the processing circuit 110 can determine that the center pixel unit of this current image becomes darker. The operation of calculating brightness difference can be performed sequentially for different pixel units at different spatial positions.

If detecting that all or most of brightness differences corresponding to pixel units at different spatial positions are larger than a particular brightness threshold, the motion sensor 100 can determine that the images may be brightened by turning on a light source and may be not with true motion. That is, a preliminarily determined motion (based on merely the calculation of pixel value differences) is caused by the illumination change such as turning on a light source instantaneously, rather than a true motion.

Further, in other embodiments, the processing circuit 110 may detect that multiple pixel units corresponding to multiple warning grids are near but not connected. In this situation, the processing circuit 110 can be arranged to determine that the preliminarily determined motion is not with a true motion and is caused by the illumination change even though the multiple pixel units are not connected. That is, the spatial positions of warning grids determined by the processing circuit 110 are not intended to be a limitation.

In addition, for a full or entire monitoring image, the processing circuit 110 may determine two groups of warning grids, i.e. two groups of pixel units. The processing circuit 110 may decide that the image area of a first group of pixel units is affected by illumination change and the image area of a second group of pixel units is with true motion when/if the brightness differences associated with the first group of pixel units are larger than another specific threshold but the differences associated with the second group of pixel units are smaller than the another specific threshold. That is, the processing circuit 110 can be arranged to detect the brightness characteristics of pixel units of warning grids. Even though the brightness characteristics may be different, the processing circuit 110 can accurately determine which portion/area of an entire image/image is affected by the illumination change and which portion/area is exactly with true motion.

Further, the processing circuit 110 can determine the brightness characteristic change or trend based on the above-mentioned calculation of brightness differences. For example, even though the characteristic of the brightness values calculated from a monitoring image totally or mostly indicates that these brightness values are larger than those calculated from a background image or a previous image, the processing circuit 110 can still determine that the monitoring image is exactly with a true motion when/if determining that the brightness differences of the monitoring image indicate a trend which is different from that of the brightness differences of the background/previous image. For example, the monitoring image is gradually brighten from top to bottom, and the brightness differences of background image indicate that the background/previous image is brightened from bottom to top. In this situation, even though all or most the brightness differences are larger than the brightness threshold, the processing circuit 110 may determine that the monitoring image is with true motion. In addition, the processing circuit 110 may decide that the monitoring image is with true motion and partially affected by illumination change.

In addition, the processing circuit 110 can be arranged to perform the calculation of brightness differences to determine whether true motion exists without calculating the difference values to calculate the correlation. The processing circuit 110 can determine that the monitoring image is exactly with a true motion when determining that the brightness differences of the monitoring image indicate a brightness difference change/trend which is different from that of brightness differences of the background/previous image. This can prevent the rolling shutter effect from interfering the detection for true motion.

For example, for an example of four pixel units or four image areas (but not limited), the brightness values of the pixel units on the previous image for example are 40, 42, 45, and 48. The brightness values of the pixel units on the monitoring image for example become 48, 50, 52, and 47 due to the light change and auto exposure (AE) conversion wherein only the last brightness value, i.e. 47 of the pixel unit on the monitoring image is smaller than the last brightness value, i.e. 48, of the pixel unit on the previous image. The processing circuit 110 may adjust the exposure level by adjusting the exposure time of the motion sensor 100 to compensate the AE conversion. In addition, the processing circuit 110 for example uses a particular brightness threshold to determine whether the monitoring image is with true motion or light change. In this situation, the difference between the two last brightness values is smaller than the particular brightness threshold, and the processing circuit 110 is arranged to determine that the images of the four pixel units is brightened together an may be with light change. Instead, if the last brightness value becomes 40 (not limited) which is extremely smaller so that the difference between the two last brightness values is larger than the particular brightness threshold, the processing circuit 110 is arranged to determine that the images of four pixel units are not brightened together and may be with true motion rather than light change.

Figure 7:
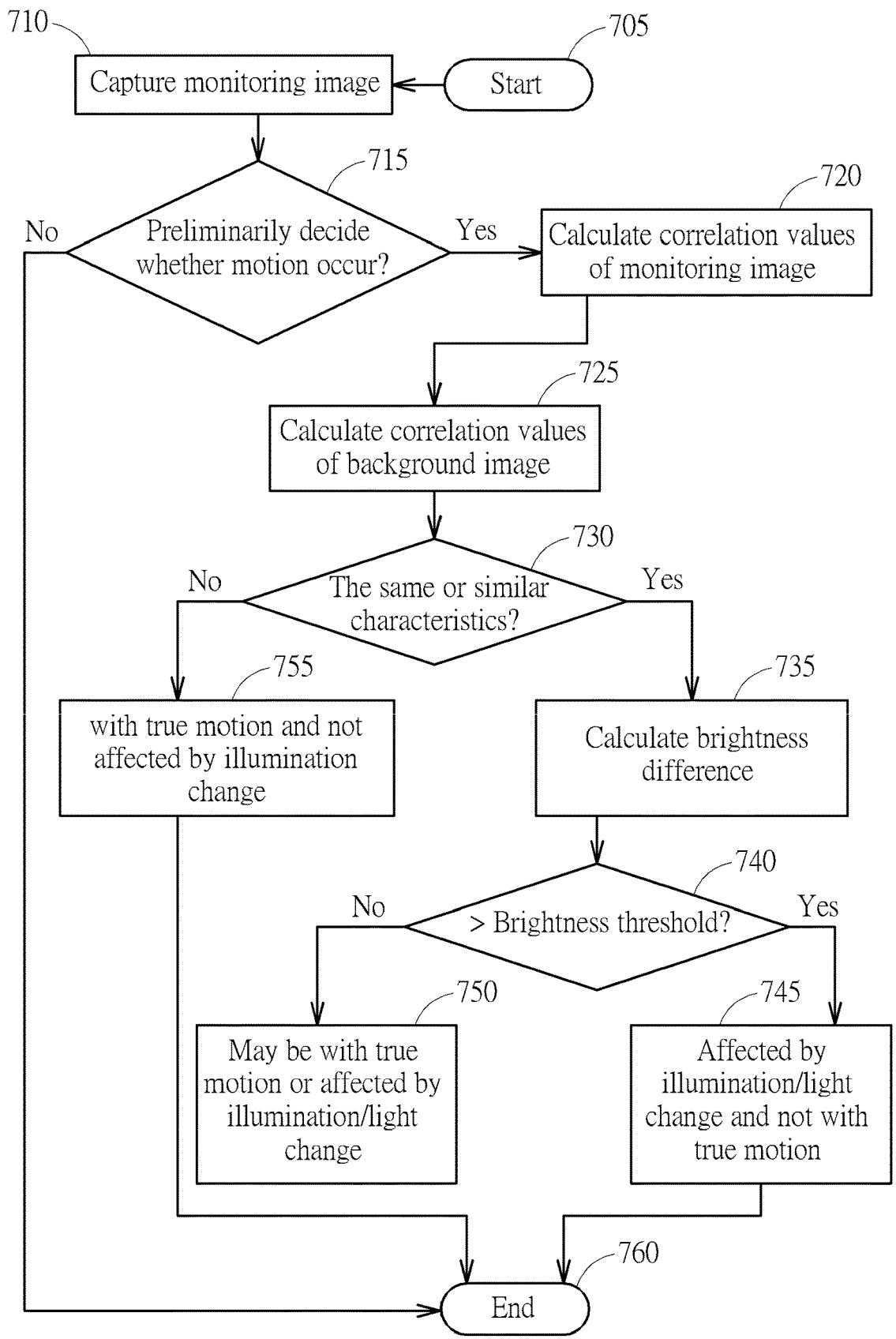
FIG. 7 is a diagram showing a flowchart of a process for more accurately detecting whether motion occurs based on the brightness values between different images according to the above-mentioned embodiments of the invention.

FIG. 7 shows a flowchart of a process for more accurately detecting whether motion occurs based on the brightness values between different images according to the above-mentioned embodiments of the invention. Steps are detailed in the following:

Step 705: Start;

Step 710: Capture a monitoring image;

Step 715: Perform an image motion detection based on the captured monitoring image and the background image to preliminarily decide whether motion occurs; if the preliminary result indicates a motion, then the flow proceeds to Step 720, otherwise, the flow proceeds to Step 760;

Step 720: Calculate the correlation values of the monitoring image as the first pattern;

Step 725: Calculate the correlation values of the background image as the second pattern;

Step 730: Compare the first pattern with the second pattern to determine whether the patterns have the same or similar characteristics; if the patterns have the same or similar characteristics, then the flow proceeds to Step 735, otherwise, the flow proceeds to Step 755;

Step 735: The processing circuit 110 calculates a brightness difference between the monitoring image and the background image;

Step 740: The processing circuit 110 determines whether the brightness difference is larger than a particular threshold; if yes, the flow proceeds to Step 745, otherwise, the flow proceeds to Step 750;

Step 745: The processing circuit 110 determines that an image area of the monitoring image or the monitoring image is exactly affected by illumination/light change and may be not with true motion;

Step 750: The processing circuit 110 determines that an image area of the monitoring image or the monitoring image may be with true motion;

Step 755: The processing circuit 110 determines that an image area of the monitoring image or the monitoring image is exactly with a motion and is not affected by light change; and Step 760: End.

Further, in other embodiments, based on the detection/calculation of brightness values, if the processing circuit 110 detects/determines that images of a group of pixel units or all pixel units in a full or entire monitoring image become brighter or darker, the processing circuit 110 can decide that the images are not with motion. Instead, if detecting that a portion among the monitoring image is brightened and another portion is darkened, the processing circuit 110 can decide that the images are with motion. In practice, the processing circuit 110 may be arranged to calculate the brightness differences between the pixel units respectively in a monitoring image and a background image. Each of the brightness differences may be calculated by subtracting the brightness value of a pixel unit in the background image from the brightness value of a pixel unit at the same spatial position in the monitoring image; however this is not intended to be a limitation. If detecting/determining that all or most brightness differences are positive and its absolute values are larger than a brightness threshold, the processing circuit 110 can decide that the images are brightened. Instead, if all or most brightness differences are negative and its absolute values are larger than the brightness threshold, the processing circuit 110 can decide that the images are darkened. If the absolute values of all or most brightness differences are smaller than the brightness threshold, the processing circuit 110 may decide that the images may be brightened or may be darkened.

Further, in other embodiments, the motion sensor 100 can be arranged to accurately discriminate or distinguish the true motion of people/animals from regular motion in a monitoring image. For example, the regular motion may mean the regular and passive motion/movement of shaking leaves or glasses blown by the wind; however, this is not intended to be a limitation. The motion sensor 100 can determine that an image area or an image is with the true motion or is with the regular motion. It is not necessary and not required for the motion sensor 100 to identify whether the image area is associated with an object of a person or an animal.

Figure 8:
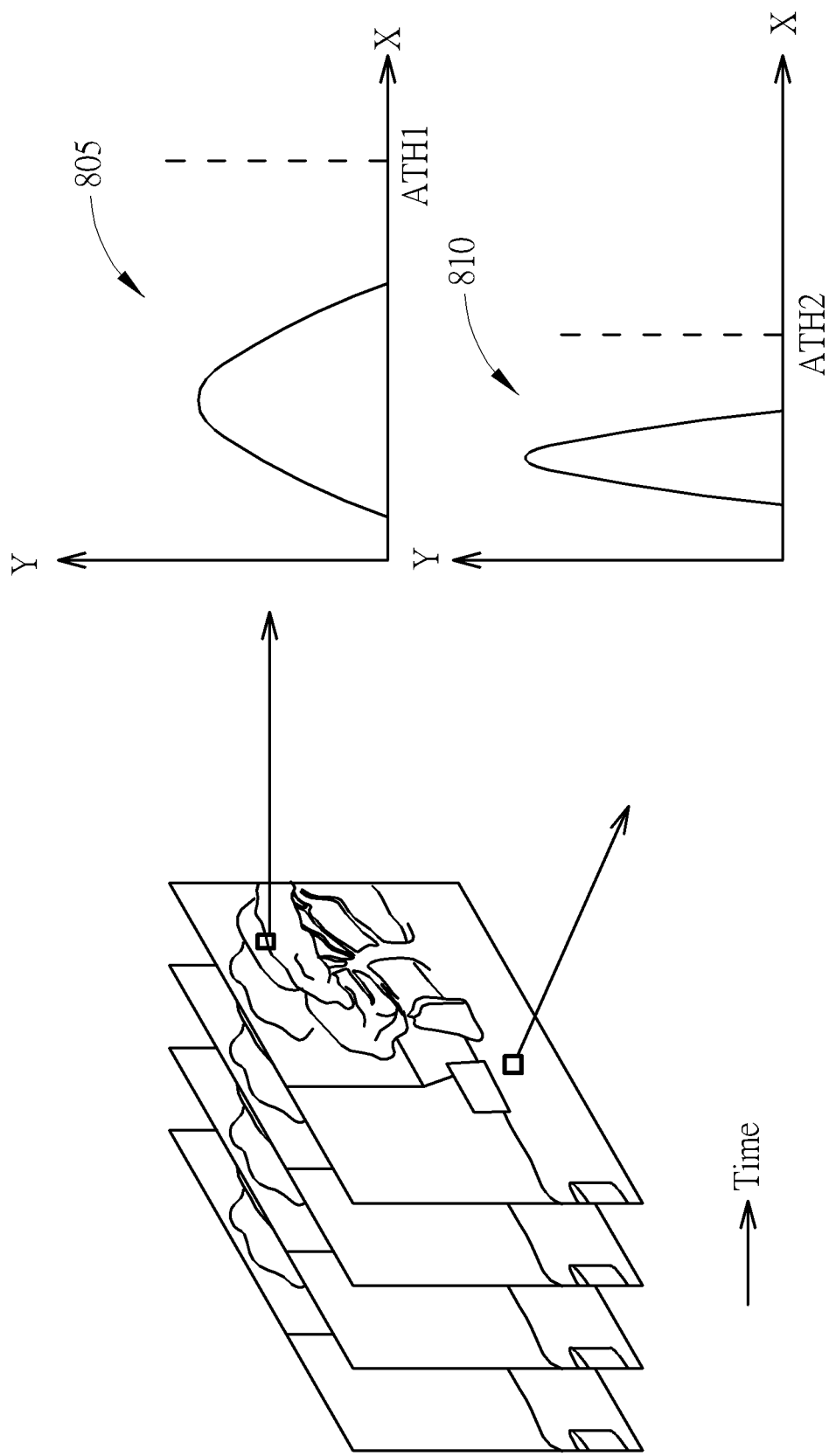
FIG. 8 is a diagram showing an example of the motion sensor capable of accurately discriminating or distinguishing the true motion of people/animals from the regular motions of shaking leaves or glasses.

FIG. 8 is a diagram showing an example of the motion sensor 100 capable of accurately discriminating or distinguishing the true motion of people/animals from the regular motions of shaking leaves or glasses. As shown on FIG. 8, the motion sensor 100 may capture multiple monitoring images at different timings to obtain a sequence of monitoring images as background images. In this example, each of the background images may comprise an image area corresponding to the shaking leaves and an image area corresponding to the glasses blown by the wind. It is easy for a conventional motion sensor to erroneously determine the motion of shaking leaves and/or the motion of glasses blown by the wind as the true motion of people/animals if the conventional motion sensor is merely to perform a conventional image motion detection operation.

In this embodiment, the processing circuit 110 is arranged to employ an adaptive motion threshold for different image areas having different image variation characteristics. For example, the processing circuit 110 may be arranged to select a higher motion threshold for the image area of shaking leaves and selects a lower motion threshold for the image area of glasses blown by the wind based on the image variation of each image area.

In practice, for the image area of shaking leaves at the same picture spatial area in the images, the processing circuit 110 may calculate a set of sums of correlation values (e.g. pixel difference values). For example, the image area of shaking leaves for example comprises multiple pixel units, and for each pixel unit the processing circuit 110 can be arranged to classify neighboring pixel units of the each pixel unit into a group of pixel units to form a style box arranged in three by three grids for the each pixel unit. The processing circuit 110 then generates eight correlation values mentioned above (but not limited) and calculate the sum of absolute values of the eight correlation values for the each pixel unit. The processing circuit 110 is arranged to configure each sum of absolute values as a measurement value which is used to indicate whether an image of the each pixel unit is like to those of neighboring pixel units. Different measurement values may correspond to different pixel unit numbers. For example, the processing circuit 110 can calculate and obtain a statistic distribution result 805 on FIG. 8 for the image area of shaking leaves. X-axis means different measurement values generated by the processing circuit 110, and Y-axis mean a number of pixel unit(s) corresponding to a particular measurement value on X-axis. Similarly, the processing circuit 110 can perform the same/similar operations for the image area of glasses blown in the wind to calculate and obtain a statistic distribution result 810 on FIG. 8.

As shown on FIG. 8, the statistic distribution result 805 has a larger variation than that of the statistic distribution result 810, and the processing circuit is arranged to dynamically determine an adaptive motion threshold for different image areas based on different variations of different statistic distribution results. For example, the processing circuit 110 may be arranged to configure a multiple of the variation of each statistic distribution result of an image area at a spatial position as the adaptive motion threshold. In this example, the processing circuit 110 may configure the threshold ATH1 for the image area of shaking leaves and the threshold ATH2 for the image of glasses.

In addition, it should be noted that the processing circuit 110 may be arranged to calculate a sum of squares of the correlation values as a measurement value in other embodiments. That is, the operation of how to calculate the measurement value may perform based on a variety of math calculations and is not meant to be a limitation of the invention.

Figure 9:
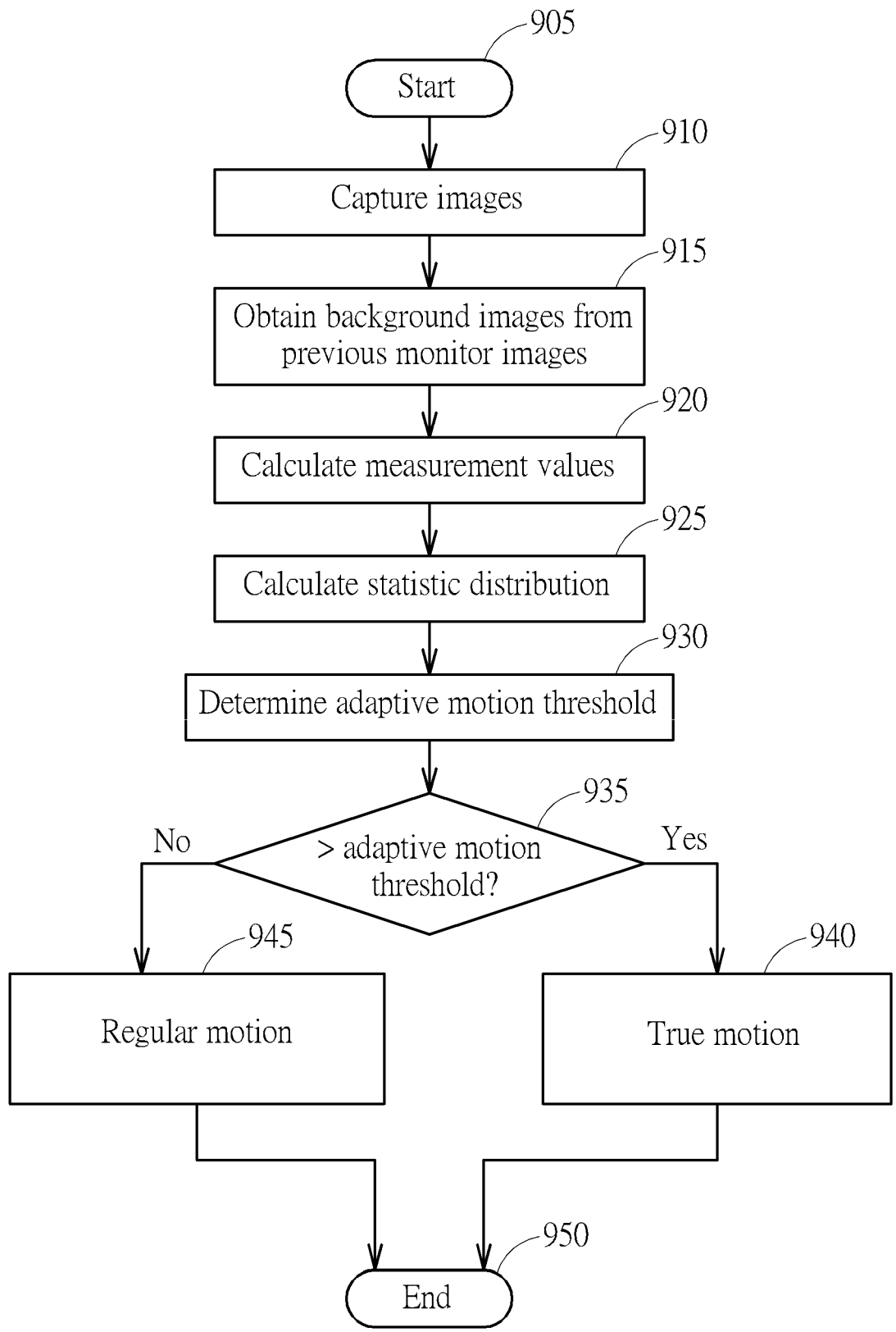
FIG. 9 is a diagram showing a flowchart of a process for more accurately discriminate true motion from regular motion according to embodiments of the invention.

FIG. 9 shows a flowchart of a process for more accurately discriminate true motion from regular motion according to embodiments of the invention. Steps are detailed in the following:

Step 905: Start;

Step 910: The motion sensor 100 captures a plurality of monitoring images;

Step 915: The processing circuit 110 obtains background images from the previous monitor images;

Step 920: The processing circuit 110 calculates measurement values for each pixel unit in a specific image area at the same spatial area in the background images wherein a measurement value is generated based on multiple correlation values respectively corresponding to different pixel units;

Step 925: The processing circuit 110 calculates and obtains a statistic distribution result based on the measurement values for the specific image area;

Step 930: The processing circuit 110 determines an adaptive motion threshold based on a variation of the measurement values of the statistic distribution result;

Step 935: The processing circuit 110 compares the adaptive motion threshold with a measurement value generated from the specific image area at the same spatial position in a monitoring image; if such measurement value is larger than the adaptive motion threshold, the flow proceeds to Step 940, otherwise, the flow proceeds to Step 945;

Step 940: The processing circuit 110 determines that true motion occurs/exist in the specific image area of such monitoring image;

Step 945: The processing circuit 110 determines that regular motion occurs/exist in the specific image area of such monitoring image; and Step 950: End.

Further, in other embodiments, the motion sensor 100 may be arranged to detect the environment condition and then determine a specific parameter a according to the detected environment condition wherein the specific parameter a is arranged to determine the number of previous monitor images which are used to generate one background images/images. For example, the processing circuit 110 may determine two or ten previous monitor images (but not limited) to generate one background image based on different environment conditions. In addition, if detecting that the environment condition is changed drastically, the processing circuit 110 may be arranged to calculate the average of ten previous images as one background image rather than the average of two previous monitor images as one background image; however, this is not meant to be a limitation.

In addition, when detecting that motion of an object occurs (no matter if it is detected by the PIR sensor or by the motion sensor being operating at the lower image rate) or the light/illumination drastically changes, the motion sensor 100 is arranged to switch from the lower image rate into the higher image rate and is operated at the higher image rate to capture images.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection method utilized for a motion sensor, comprising:
    capturing a monitoring image;
    comparing the monitoring image's quality with a disqualify threshold based on at least one intensity change value associated with the monitoring image;
    determining whether to enter a recording mode according to the monitoring image if it is determined that the monitoring image's quality is not under the disqualify threshold;
    determining to enter the recording mode based on a result of a trigger signal from an auxiliary sensor being received if the monitoring image's quality is under the disqualify threshold;
    entering the recording mode when the at least one intensity change value between the monitoring image and a pre-stored background image is higher than a first threshold and the trigger signal is received from an auxiliary sensor; and
    entering the recording mode when the at least one intensity change value is higher than a second threshold before the trigger signal is received;
    wherein the second threshold is higher than the first threshold.

2. The method of claim 1, wherein the step of capturing the monitoring image is to periodically capture a single one monitoring image.

3. The method of claim 1, wherein the at least one intensity change value comprises a brightness intensity change value and a darkness intensity change value, and the method further comprises:
    adjusting the auto exposure level of the motion sensor when one of the brightness intensity change value and the darkness intensity change value is lower than the first threshold, the other of the brightness intensity change value and the darkness intensity change value is higher than the first threshold, and the trigger signal is received from the auxiliary sensor.

4. A motion detection method utilized for a motion sensor, comprising:
    capturing a monitoring image;
    comparing the monitoring image and a pre-stored background image;
    entering a recording mode if at least one first specific number of pixels becomes brighter from the pre-stored background image to the monitoring image, and at least one second specific number of pixels becomes darker from the pre-stored background image to the monitoring image;
    entering the recording mode when at least one intensity change value between the monitoring image and the pre-stored background image is higher than a first threshold and a trigger signal is received from an auxiliary sensor; and
    entering the recording mode when the at least one intensity change value is higher than a second threshold before the trigger signal is received;
    wherein the second threshold is higher than the first threshold.

5. The method of claim 4, wherein the step of capturing the monitoring image is to periodically capture a single one monitoring image.

6. The method of claim 4, wherein the at least one intensity change value comprises a brightness intensity change value and a darkness intensity change value, and the method further comprises:
    adjusting the auto exposure level of the motion sensor when one of the brightness intensity change value and the darkness intensity change value is lower than the first threshold, the other of the brightness intensity change value and the darkness intensity change value is higher than the first threshold, and the trigger signal is received from the auxiliary sensor.

* * * * *